United States Patent
Van De Sanden et al.

(10) Patent No.: US 7,798,724 B2
(45) Date of Patent: Sep. 21, 2010

(54) BEARING WITH LIGHT WEIGHT METAL AND CERAMIC MATERIAL

(75) Inventors: Johannes Franciscus Van De Sanden, DT Nieuwegein (NL); Martinus Maria Jozef Noordman, RG Hilversum (NL); Alexander Jan Carel De Vries, KA Tiel (NL); Peggy Suzanne Charlotte Vieillard, AC Nieuwegein (NL)

(73) Assignee: AB SKF, Gothenburg (SE)

( * ) Notice: Subject to any disclaimer, the term of this patent is extended or adjusted under 35 U.S.C. 154(b) by 654 days.

(21) Appl. No.: 11/632,624

(22) PCT Filed: Jul. 15, 2005

(86) PCT No.: PCT/NL2005/000511
§ 371 (c)(1),
(2), (4) Date: Mar. 27, 2007

(87) PCT Pub. No.: WO2006/009430
PCT Pub. Date: Jan. 26, 2006

(65) Prior Publication Data
US 2008/0101735 A1    May 1, 2008

(30) Foreign Application Priority Data
Jul. 16, 2004   (EP) .................................. 04077052

(51) Int. Cl.
*F16C 33/62* (2006.01)
*F16C 19/00* (2006.01)

(52) U.S. Cl. .............................. 384/492; 384/7; 384/39; 384/445; 384/907; 29/898.063

(58) Field of Classification Search ......... 384/203–209, 384/261, 476, 537, 491–492, 615, 907.1, 384/913, 7, 455; 29/898.066, 898.063
See application file for complete search history.

(56) References Cited

U.S. PATENT DOCUMENTS 4,478,438 A * 10/1984 Elorriaga, Jr. ............... 285/276

(Continued)

FOREIGN PATENT DOCUMENTS

GB        2 278 650 A        12/1994

(Continued)

OTHER PUBLICATIONS

International Search Report, Oct. 27, 2005.

*Primary Examiner*—Marcus Charles
(74) *Attorney, Agent, or Firm*—Buchanan Ingersoll & Rooney PC

(57) ABSTRACT

A bearing includes an inner bearing ring on which a raceway is formed. The ring includes at least a first component of light metal material and at least a second component of fully dense ceramic material, where the first component and the second component are separate entities joined together, and where the second component forms at least part of the raceway. The first component includes two lightweight metal parts interconnected by a screw thread which can be tightened to induce compressive pre-stress in the second component to compensate for low tensile strength of the ceramic material.

11 Claims, 2 Drawing Sheets

U.S. PATENT DOCUMENTS

| | | | | |
|---|---|---|---|---|
| 4,825,719 A * | 5/1989 | Romano | ............. | 74/594.4 |
| 4,848,934 A | 7/1989 | Blakely et al. | | |
| 5,439,297 A * | 8/1995 | Kitayama | ............. | 384/492 |
| 5,518,820 A * | 5/1996 | Averbach et al. | ............. | 428/469 |
| 5,718,517 A * | 2/1998 | Morando | ............. | 384/192 |
| 5,915,842 A * | 6/1999 | Redinger | ............. | 384/203 |
| 5,971,620 A * | 10/1999 | Gabelli et al. | ............. | 384/491 |
| 6,325,544 B1 * | 12/2001 | Sasaki et al. | ............. | 384/192 |
| 6,505,974 B2 * | 1/2003 | Giesler et al. | ............. | 384/565 |
| 6,655,845 B1 * | 12/2003 | Pope et al. | ............. | 384/492 |
| 6,732,435 B2 * | 5/2004 | Kiyosawa | ............. | 29/898.066 |
| 6,960,022 B2 * | 11/2005 | Beatson et al. | ............. | 384/39 |
| 6,966,701 B2 * | 11/2005 | Schelbert | ............. | 384/476 |
| 2002/0174545 A1 | 11/2002 | Kiyosawa | | |
| 2002/0191878 A1 | 12/2002 | Ueda et al. | | |

FOREIGN PATENT DOCUMENTS

| | | | |
|---|---|---|---|
| GB | 2 285 490 A | | 7/1995 |
| JP | 58-163821 | | 9/1983 |
| JP | 01261519 A | * | 10/1989 |
| JP | 4-69406 | | 3/1992 |

\* cited by examiner

BEARING WITH LIGHT WEIGHT METAL AND CERAMIC MATERIAL

BACKGROUND

The invention relates to a bearing comprising at least one bearing ring on which a raceway is formed.

Whenever in this document the word bearing is used, it shall be understood to include also bearing units, which may comprise more than one bearing. When rings are mentioned, these rings may comprise also non-annular parts such as flanges with ears and bolt holes, e.g. for mounting the bearing or ring into its application. Bearings include sliding bearings and rolling bearings of different kinds, such as ball bearings, taper roller bearings, cylindrical roller bearings, spherical roller bearings, etc.

Bearings are used in very many different applications, for transferring forces or loads from rotating parts to stationary parts and/or vice versa. Each application has its own operating conditions and hence will put its own requirements to the capabilities and functionality of the bearing. To enable the bearing to transfer an important force or load, most bearings are formed from so called bearing steel, which is highly alloyed steel, with capabilities to be hardened to quite high hardness. This will give the bearing a high strength that it needs to be able to transfer the high loads required.

Certain bearing applications are strongly influenced by the weight of the bearing and do require the bearing to have as low a weight as possible. Sometimes this requirement is combined with the requirement that the bearing is corrosion resistant. Such requirements are found e.g. in the aircraft industry and the food industry.

U.S. Patent application US 2002/0191878 describes a bearing where the bearing rings are formed of a kind of titanium alloy with a ceramic film on the raceway and the rolling elements are formed of a ceramic material. These materials do fulfil the requirements regarding reduced weight as well as regarding corrosion resistance to a large extent. However material such as titanium is usually not strong enough to sustain the loads required. This is equally valid for a ceramic film.

UK Patent application GB 2 285 490 describes a bearing member, notably a constant velocity joint, where the bearing tracks are provided by a rigid porous ceramic insert, infiltrated with light metal alloy in the pores, the remainder of the outer member being formed of said light metal alloy. However a porous ceramic insert is not able to withstand loads such as they occur e.g. in raceways of roller bearings.

It is an aim of the present invention to provide a bearing that is lightweight, has good corrosion resistance and also has the capability to carry high loads, such a occur in raceways of roller bearings.

BRIEF SUMMARY

A bearing disclosed herein gives the advantages of being lightweight and corrosion resistant. Ceramic material can withstand high stresses, so when the areas that are subjected to relatively high stresses are formed with the fully dense ceramic material of sufficient thickness, such a bearing can sustain high stresses as well as being of light weight and corrosion resistant. Also it is advantageous to use metal for the major part of the bearing. It has good formability and or machinability, so the more complex shapes can be made to the high tolerances, that are a common requirement in bearings, with well known and proven techniques. The ceramic material, that usually is more difficult to shape, is used only in the places where high stresses occur. Parts of the bearing raceway are the places where the highest stresses occur in bearings and thus the second component comprises these parts of the raceway. Because the ceramic component must have the proper thickness and be fully dense, the ceramic component is manufactured separately and is then joined to the light metal component.

Suitable lightweight metal materials can be aluminium, titanium, magnesium, and any alloy of any one of said metals. They are both lightweight with a relatively low specific density and also exhibit good corrosion resistant properties.

Suitable ceramic materials, which can sustain the high stresses, can be silicon nitride, zirconium oxide, aluminium oxide, borium carbide, borium nitride, aluminium nitride, silicon carbide, any combination of any one of these materials.

It can be of advantage in the manufacturing process to form the parts from metal and the parts from ceramic in separate processes and then join the two parts. A good transfer of the stresses from the ceramic material to the metal is obtained when the two parts from different material are joined by a joining method selected from the group comprising brazing, gluing, soldering, shrink fitting, screwing, bolting, riveting and combinations of these.

When the bearing is a rolling element bearing, the rolling elements can be from ceramic material, but if the requirements on the rolling elements regarding weight and/or corrosion resistance are less strict, it gives a cost advantage to use steel balls or rolling elements.

Ceramic materials can withstand relatively high stresses, but mainly compressive stresses. In the case of tensile stresses the material is much weaker. It is therefore advantageous if the ceramic parts of the bearing are given a pre-stress in compression such that this pre-stress compensates for the tensile stresses that may occur during operation. For outer rings this can easily by achieved using thermal expansion during joining of the metal and the ceramic part, by mounting a cold ceramic piece in a warm outer ring. For inner rings using two threaded bushings with flanges can solve this. The threaded bushings are then screwed together such that the flanges press inwardly against the sides of the inner ring, thus putting the ring material, including the ceramic part, in compression.

BRIEF DESCRIPTION OF DRAWINGS

The invention will now be further explained by describing an example of an embodiment of a bearing according to the invention. The description will be made with reference to the drawing, where.

DETAILED DESCRIPTION OF PREFERRED EMBODIMENTS

Figure 1:
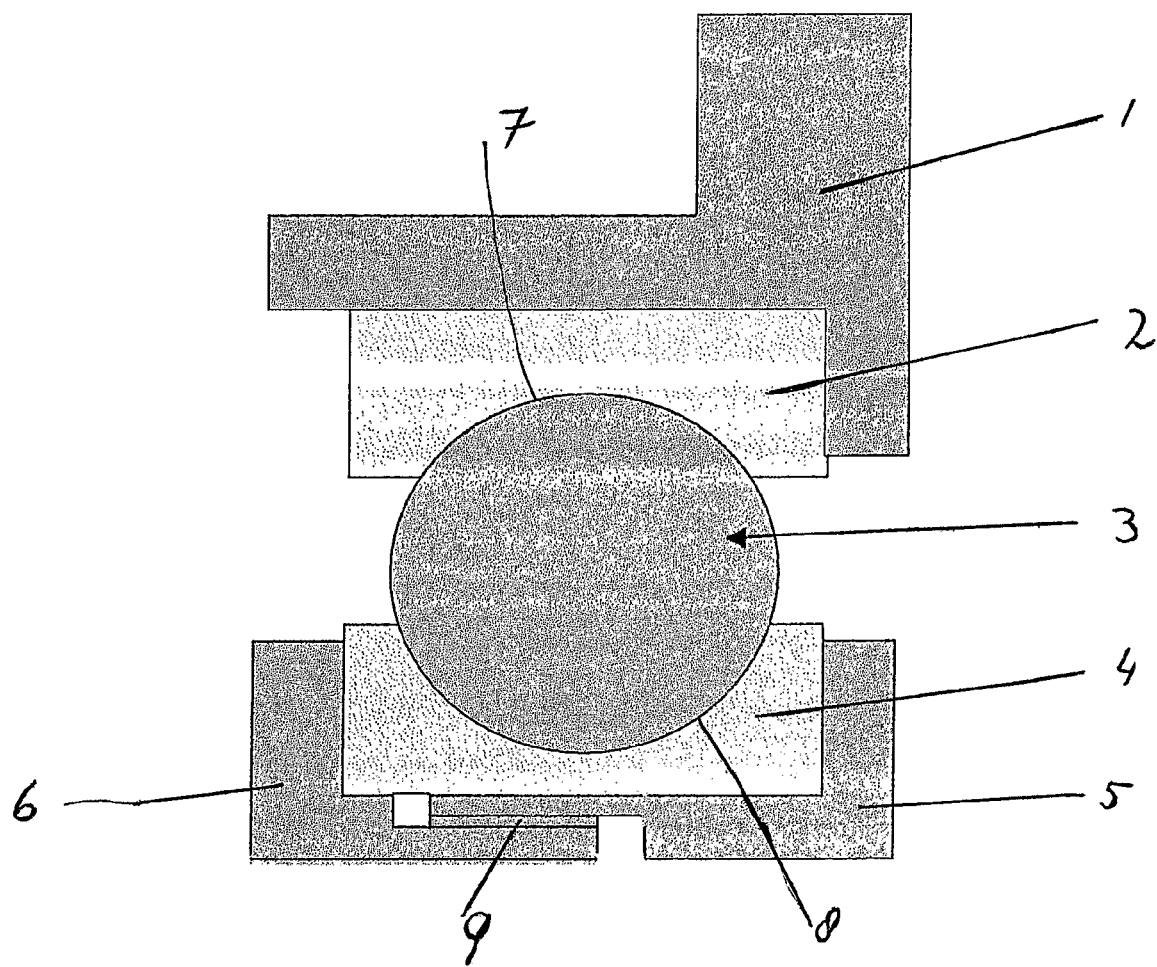
FIG. 1 shows an example of a deep groove ball bearing with a flanged outer ring according to the invention.

FIG. 1 shows an example of a deep groove ball bearing with a flanged outer ring 1, 2. The flanged outer ring comprises a lightweight metal part 1, which has a ceramic insert 2. The insert 2 comprises the outer ring raceway 7, on which balls 3 are running. Balls 3 are also made of ceramic material. By forming the balls and raceways from ceramic material, and the remaining parts from corrosion resistant lightweight material, it is possible in certain applications to do without lubricant. E.g. in bearings that support the movement of wing flaps in aircraft, this reduces maintenance considerably, since systems for lubrication are no longer necessary.

The ceramic insert 2 has been mounted in the lightweight metal part 1 of the outer ring with a tight fit. This tight fit provides the required compressive stress in the ceramic insert 2. The mounting has taken place by heating the lightweight metal part 1 before inserting insert 2. For additional bonding, the ceramic insert 2 can also be glued, soldered or brazed to the lightweight metal part 1.

In a similar way the inner ring 4, 5, 6 comprises a lightweight metal part 5, 6 and a ceramic insert 4 which comprises the inner ring raceway 8. In this case compressive stress is not imparted to the ceramic insert 4 by thermal expansion. Instead lightweight metal parts 5, 6 are connected by a threaded connection 9. By tightening the screw connection 9, compressive stresses are induced in ceramic insert 4.

Thus a lightweight bearing that also does exhibit anti corrosion properties is obtained. The ceramic insert will take up the stresses at the point where these stresses are highest. Since ceramic materials can withstand rather high (compressive) stresses, the bearing thus conceived, is capable to withstand rather high loads.

In cases where the bearing comprises a seal, to keep contaminants away from the raceways, and to keep a lubricant, e.g. grease, supplied to the raceways, it may be preferred to use balls formed from steel instead of the still relatively costly ceramic balls.

Figure 2:
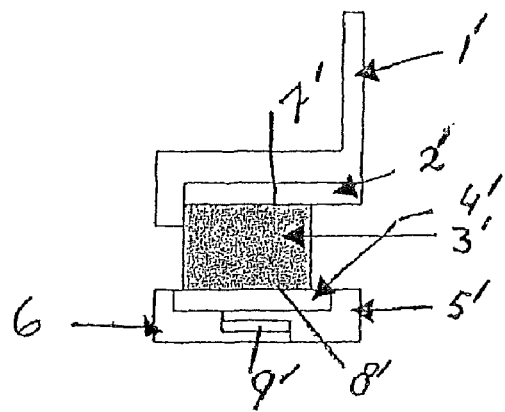
FIG. 2 shows an example of a cylindrical roller bearing with a flanged outer ring according to the invention.
Figure 3:
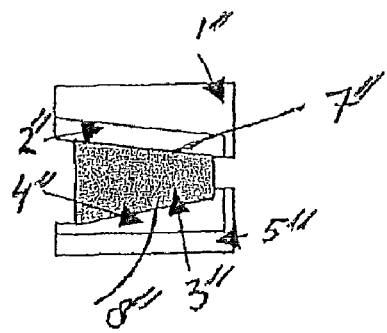
FIG. 3 shows an example of a taper roller bearing according to the invention.
Figure 4:
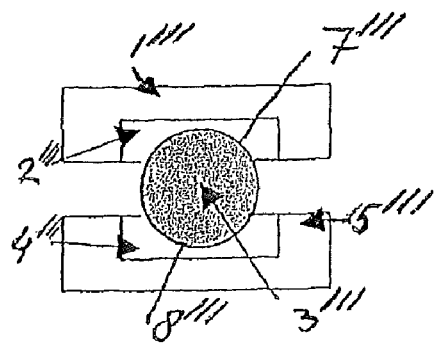
FIG. 4 shows an example of a deep groove ball bearing according to the invention.

In FIGS. 2, 3 and 4 further examples are shown of bearings according to the invention, wherein reference numerals corresponding to those of FIG. 1 are shown with single-prime, double-prime, and triple-prime superscripts, respectively.

FIG. 2 shows a cylindrical roller bearing in a similar configuration as the deep groove ball bearing of FIG. 1. I.e. Lightweight metal part 1' of the outer ring comprises a flange and lightweight metal part 5', 6' of the inner ring comprises a screw connection 9' for the possibility to provide a compressive stress to ceramic inner ring part 4'.

FIG. 3 shows a taper roller bearing with lightweight metal ring parts 1", 5" and ceramic ring parts 2", 4" of the outer and inner ring respectively. In this case the outer ring nor the inner ring comprises a flange. Also no means for inducing a compressive stress to the inner ring is shown.

A similar example showing a deep groove ball bearing is shown in FIG. 4.

Not all examples shown did show a means for inducing a compressive stress into the inner ring. This is not needed in all applications. Notably such means are required where the inner ring needs to be mounted on e.g. a shaft with an interference fit. This is not always the case. There do exist applications where no tensile stress will be induced by the application and hence there is no need to induce a compressive stress.

Also in two of the examples shown, the outer ring comprised a flange. This is not limited to the outer ring. Also the inner ring can comprise a flange, or both. These flanges can have many different shapes. Inner rings where functionality has been added and that consequently have shapes that deviate from the ones described also fall under the scope of the invention that is defined by the attached claims.

The invention claimed is:

1. Bearing comprising an outer ring and an inner ring, each of the rings comprising at least a first component consisting essentially of a metal material and at least a second component consisting essentially of fully dense ceramic material, wherein the first component and the second component are separate elements joined together, and wherein the second component forms at least part of a raceway, the metal material is a lightweight metal, and the first component of the inner ring comprises two lightweight metal parts interconnected by a screw thread which can be tightened to induce compressive pre-stress in the second component of the inner ring.

2. Bearing according to claim 1, wherein the lightweight metal material is selected from the group comprising the metals aluminium, titanium, magnesium, and any alloy of any one of said metals.

3. Bearing according to claim 1, wherein the ceramic material is selected from the group comprising silicon nitride, zirconium oxide, aluminium oxide, borium carbide, borium nitride, aluminium nitride, silicon carbide, and any combination of said materials.

4. Bearing according to claim 1, wherein the bearing is a rolling elements bearing.

5. Bearing according to claim 4, wherein the rolling elements are of ceramic material.

6. Bearing according to claim 4, wherein the rolling elements are of steel.

7. Bearing according to claim 1, wherein the bearing is a sliding bearing.

8. Bearing according to claim 1, wherein the two lightweight metal parts of the first component of the inner ring comprise two threaded bushings with flanges.

9. Bearing according to claim 1, wherein the compressive prestress to the second component of the inner ring is applied solely in the axial direction from two opposing axial sides of such second component.

10. Bearing according to claim 1, wherein the first and second components of the outer ring are joined by a shrink fit.

11. Bearing according to claim 10, wherein the first component and the second component are additionally joined by a joining method selected from the group comprising brazing, gluing and soldering.

\* \* \* \* \*